July 17, 1951  E. W. TODD  2,561,078
PLANTER MARKER

Filed June 5, 1946  2 Sheets-Sheet 1

INVENTOR.
EVERETT W. TODD
BY
A. Strob
ATTORNEY

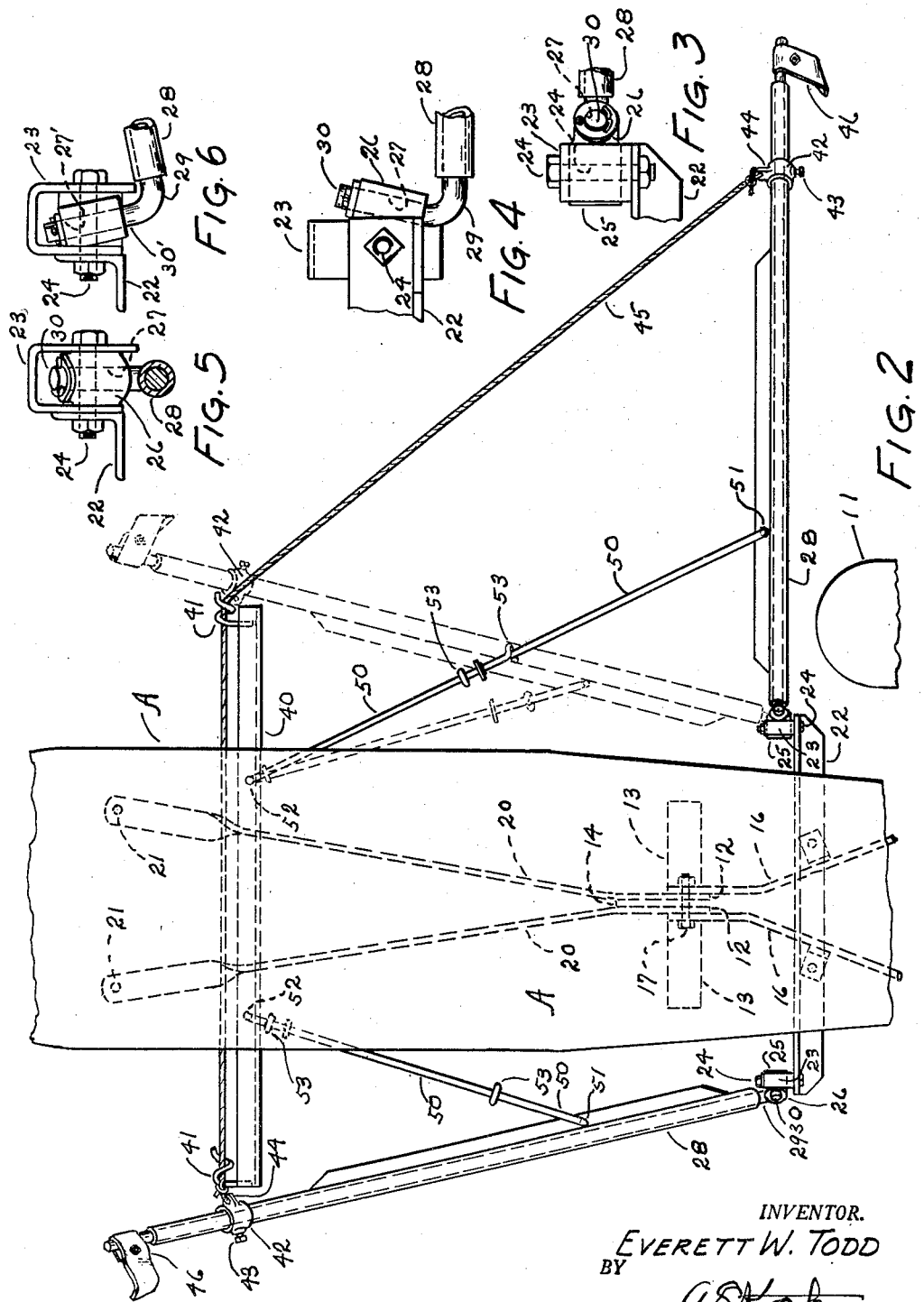

Patented July 17, 1951

2,561,078

UNITED STATES PATENT OFFICE 2,561,078

PLANTER MARKER

Everett W. Todd, Racine, Wis., assignor to The Massey-Harris Company, Racine, Wis., a company of Maryland Application June 5, 1946, Serial No. 674,486

4 Claims. (Cl. 97—230)

The present invention relates to a marker for a two row planter directly connected to the tractor, wherein the marker is mounted on the planter hitching means, under the tractor and between the front and rear wheels.

An object of the present invention, generally stated is, to provide a marker for the purpose which is simple, easily manufactured at low cost and conveniently and easily attached to the forward end of the planter frame and the hitching means attached to the tractor.

An object of the present invention is to provide a marker which is automatic in its action. In other words, a marker wherein the last used marker arm is automatically raised from the ground and the other marker is automatically caused to move to its operating position and engage the ground when the tractor is turned at the end of the row.

A further object of the present invention is to provide a safety link for each of the marker arms, each of which remains inactive so long as the rope which controls the marker arms is active or not broken but having means whereby if the rope is broken each of the marker arms will be held from moving rearwardly into the rear wheels of the tractor.

To these and other useful ends my invention consists of parts, combinations of parts or their equivalents and mode of operation as hereinafter described and claimed and shown in the accompanying drawings in which:

Fig. 2 is a top view of my invention, a fraction of the tractor being shown and the parts under the tractor being shown by dotted lines.

Fig. 3 is an enlarged top view of one of the marker hinges, showing a fraction of the transverse bar and marker.

Fig. 4 is an enlarged rear view of a marker hinge showing a fraction of the transverse bar and marker as shown in Figure 3.

Fig. 5 is an enlarged end view of the device as shown in Figures 3 and 4.

Fig. 6 illustrates a modification of the device shown in Figure 5.

Figure 1:
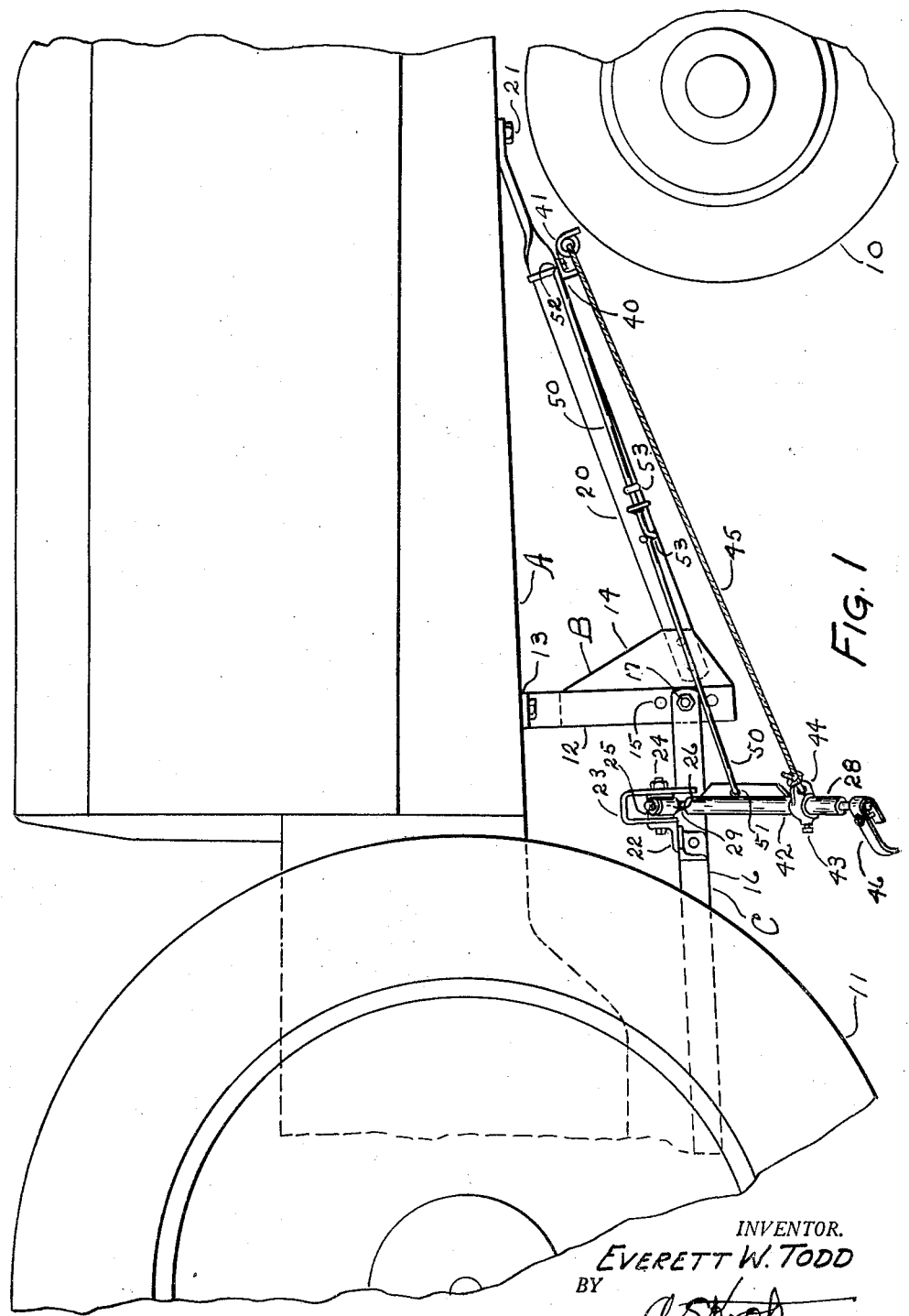
Fig. 1 is a side elevational view of my invention shown as attached to a tractor, a fraction only of the tractor and planter being shown.

As thus illustrated the tractor is designated by reference character A. The tractor hitch is designated by reference character B and the forward end of the planter frame is designated by reference character C. The front wheels are designated by reference numeral 10 and the rear wheels by reference numeral 11. Hitch B comprises spaced depending arms 12—12 which are secured to the frame of the tractor by means of outwardly extending feet 13—13. I secure a plate 14 between members 12, and members 12 and 14 have a number of spaced openings 15 whereby the front end of the implement hitched to the tractor may be vertically adjustably attached. In the drawings 16—16 designates the front end of the planter frame C, these members straddling members 12 and being secured to members 12 and 14 by means of a bolt 17.

I preferably provide two braces 20—20 which are secured to member 14 and diverge forwardly and upwardly and being secured at their forward ends to the tractor as at 21—21. Thus hitch B is securely attached to the tractor and will answer as a hitch for other implements having forwardly extending frame members similar to members C.

I mount a transverse bar 22 on members 16 as illustrated. On the ends of member 22 I secure U-shaped members 23 having pivotally mounted therebetween by means of bolts 24, hinge blocks 25—25. These hinge blocks are shaped preferably about as shown in Figures 3, 4 and 5, each having a projection 26. The projection has an opening 27 which is positioned at right angle to bolt 24. Two marker arms 28—28 have secured to their inner ends preferably solid shafts 29 with ends 30 which are at an angle to members 28 considerable less than 90° (see Figure 4).

Thus because of bolts 24 and end members 30 when markers 28 are in a working position or at right angles to the tractor they are free to move vertically at their outer ends; however when the markers are moved forward as illustrated on the left of Figure 2 because of the angle of members 30, the free end of member 28 will be raised to the position shown as will hereinafter appear. Near the forward end of members 20 I mount a transverse angle iron 40 and on each end I secure what is commonly termed a pigtail 41—41.

Near the outer end of members 28, I secure collars 42—42 which are held in position by means of set screws 43—43. On the forward sides of these collars I provide projections 44—44 having openings for the reception of the ends of a rope 45, the rope being tied at its ends to the collars so when it is taut one of the markers 28 will be held at right angle to the tractor and the other marker held to its raised and forward position as shown on the left of Figure 2, the rope passing through pigtails 41. The object of these pigtails is to make it possible to disconnect the rope and swing both markers forward and disconnect planter members 16 from arms 12 and either pull the planter rearwardly or drive the tractor forward when it is desired to connect some other kind of an implement to members 12.

A modification of the marker hinges as shown in Figures 3, 4 and 5 is shown in Figure 6. Member 30' is at right angles to member 28 and the angle of the aperture 27' is such as will answer to lift the marker when it is moved to its forward position.

On the outer ends of members 28 I provide preferably a furrow opener 46 capable of making a mark in the soil which is discernible to the operator of the tractor on his return trip. Thus when the end of the field is reached and the tractor is turned for the return trip or toward the furrow made by the marker, the active marker will be moved forward, the rope will be released so the other opener 46 will contact the ground and swing rearwardly to its limit of movement as determined by the length of the rope. The other marker will be held in the position shown by dotted lines on the right of Figure 2.

Thus applicant has provided an automatic planter marker for use on a tractor to which a planter is attached. Clearly for one reason or another, rope 45 may be broken; if this should happen while the tractor is being driven forward both markers 28 would swing rearwardly and be run over by the tractor wheels and destroyed. To prevent this eventuality I provide two pairs of rods 50—50, the rear rods of each pair being pivotally secured to the markers as at 51 and their front rods being pivotally secured to member 40 as at 52, each member 50 has a loop 53—53 which surrounds the adjacent rod, members 50 being the same length and the loops each surrounding the adjacent rod so when one or the other marker 28 is in its working position, loops 53 will be a short distance apart.

Thus the distance between members 53 will prevent rods 50 from sagging at their center and perhaps contact the ground, however this distance is not great enough to permit markers 28 to swing back far enough to be contacted by the tractor wheels. Thus members 50 may act to protect the markers if the rope is broken or becomes untied.

Clearly many minor detailed changes may be made in the design shown without departing from the spirit and scope of the appended claims. For example apertures 27 may be positioned at an angle as shown in Figure 6 and shaft ends 30 may be substantially at right angles to markers 28. Thus the angle of apertures 27 would act similar to the angle of members 30.

Having thus shown and described my invention I claim:

1. In combination with a tractor, an elongated hitch member secured to the under side of the tractor near the forward end and at the transverse center thereof, a planter hitch member, its front end adapted to be loosely detachably attached to the rear end of the tractor hitch member, the rear end of said tractor hitch member being a distance forward of the front edges of the rear wheels of the tractor, a transverse bar secured to the planter hitch member substantially forward of the front edge of the rear wheels of the tractor and having a length considerably less than the distance between said rear tractor wheels, a hinge connecting each marker arm to the end of said transverse bar, said hinges adapted to permit the marker arms to move from an extended position transverse to the tractor to a forward position in direction of travel, another transverse bar secured to the forward end of the planter hitch member and being considerably longer than the first transverse bar having means for detachably slidably holding a rope, the ends of said rope being connected to the marker arms thereby to limit the outward movement of one marker arm when the other marker arm is engaged by the end of said other transverse bar, whereby when the marker arms are in parallel or forwardly converging position, and the planter hitch and ropes are detached, the tractor can be driven forward clear of said marker arms.

2. A device as recited in claim 1 including, said hinges having means, whereby when a marker arm is moved forward by the other marker arm the hinge of the first mentioned marker arm will cooperate with the rope to assist said first mentioned arm to contact said other transverse bar.

3. A device as recited in claim 1 including, said hinges comprising blocks hinged horizontally and transverse to said transverse bar, said blocks having apertures which are transverse to the block hinges, said marker arms having shafts on their inner ends which are bent upwardly and outwardly at an acute angle to the arms and being adapted to be hingedly inserted into said apertures, thereby to provide free vertical movement of the outer end of the marker arm when in an operating position and to cooperate with said rope in holding the marker bar in an elevated position when moved to its foremost operating position.

4. A device as recited in claim 1 including, said hinges comprising blocks hinged horizontally and transverse to said transverse bar and having apertures which are inclined upwardly and rearwardly relative to said block hinges, said marker arms having shafts on their inner ends which are bent at substantially a right angle to said arms and adapted to be pivotally inserted into said apertures, whereby when one of said marker arms is in its operating position, said block will provide free vertical movement of the free end thereof and when the outer end of the other marker arm is in contact with said other transverse bar, the shaft and block of said one marker arm will assist said rope in holding the other marker arm in an elevated position.

EVERETT W. TODD.

REFERENCES CITED

The following references are of record in the file of this patent:

UNITED STATES PATENTS

| Number | Name | Date |
|---|---|---|
| 695,218 | Lindsay | Mar. 11, 1902 |
| 821,593 | Lindsay | May 22, 1906 |
| 1,040,364 | Lindsay | Oct. 8, 1912 |
| 1,086,983 | Barry | Feb. 10, 1914 |
| 1,255,532 | Hayes | Feb. 5, 1918 |
| 1,432,986 | Englund | Oct. 24, 1922 |
| 1,460,457 | Traphagen | July 3, 1923 |
| 1,471,182 | McKahin | Oct. 16, 1923 |
| 1,932,107 | Hipple | Oct. 24, 1933 |
| 2,130,512 | Silver | Sept. 20, 1938 |
| 2,331,730 | Rusco | Oct. 12, 1943 |
| 2,338,632 | Frazier | Jan. 4, 1944 |